J. SULLIVAN.
Straw Cutter.
No. 8,084.
Patented May 13, 1851.
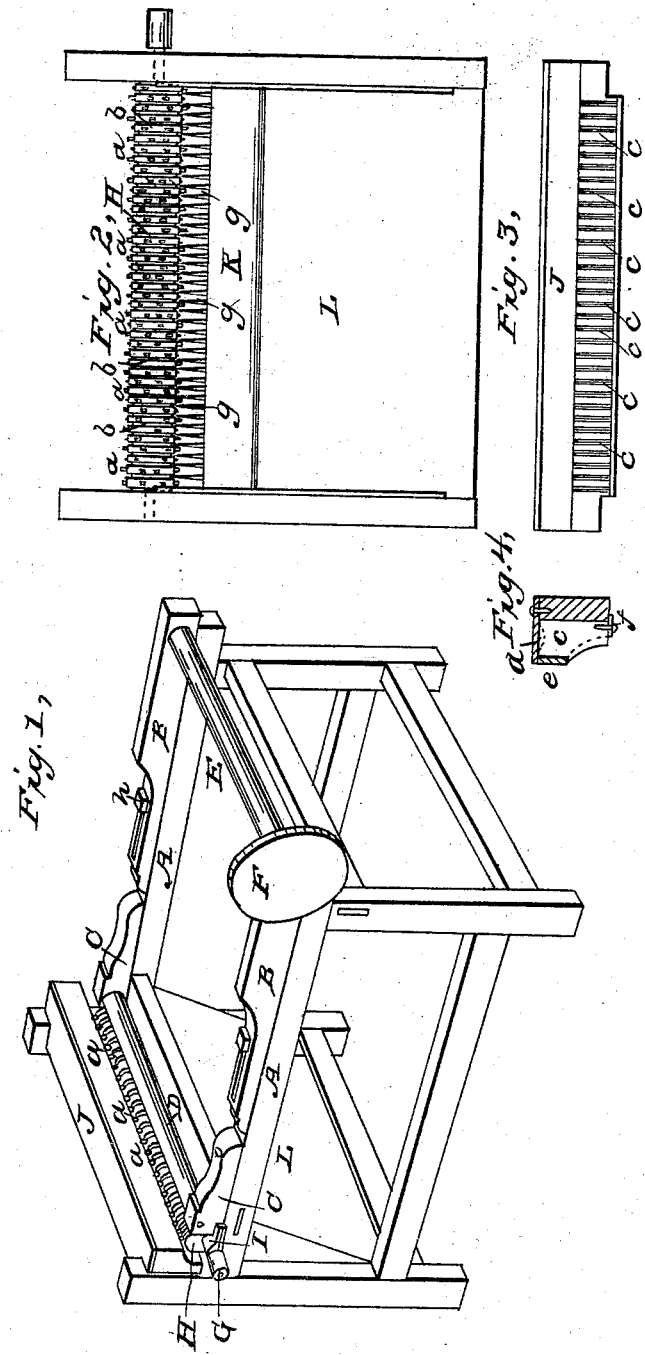

UNITED STATES PATENT OFFICE.

JONATHAN SULLIVAN, OF LEXINGTON, NORTH CAROLINA.

STRAW-CUTTER.

Specification of Letters Patent No. 8,084, dated May 13, 1851.

*To all whom it may concern:*

Be it known that I, JONATHAN SULLIVAN, of Lexington, in the county of Davidson and State of North Carolina, have invented a new and useful Improvement in Straw-Cutters; and I do hereby declare the following to be a full, clear, and exact description of the same, reference being had to the accompanying drawings, making a part thereof, in which—

Figure 1, represents a perspective view of the machine. Fig. 2, represents an end view of the same with the cutter stock removed. Fig. 3, a front view of the cutter stock and knives. Fig. 4, a vertical section through the cutter stock showing the shape of the knives.

Similar letters in the several figures represent the same parts.

The nature of my invention consists in arranging a series of curved stationary knives in a cutter stock of sufficient length to cut the straw when fed in crosswise, and against which knives, the straw which is received from an endless apron, is forced by a toothed cylinder, said cylinder having also grooves cut in it at suitable distances in its length, through which, or into which the knives extend, and also arranging underneath the cylinder a series of cleaners, the points of which enter the grooves in the cylinder and clean the said grooves of any straw which may remain in them after passing the knives.

To enable others skilled in the art to make and use my invention, I will proceed to describe the same with reference to the drawings.

On the top longitudinal pieces of a frame A, A, Fig. 1, made of sufficient width to receive and carry the straw crosswise, I arrange two sets of bearing blocks B, B, and C, C, one set of which B, B, are slotted, and by means of a set screw may be moved forward or back on the frame and adjusted for purposes to be hereafter mentioned. In these bearing blocks rest the shafts D, E, which turn freely upon their journals, and around the shafts may pass an endless apron for receiving and feeding up the straw to the toothed cylinder H. On one of the ends of the shaft E, is arranged a pulley F, over which a belt is passed from a smaller pulley G, on one of the ends of the toothed cylinder H, which gives motion to the endless apron, and on the other end of the toothed cylinder aforesaid is arranged a crank, by means of which motion is given to the machine.

In front of the bearing blocks C, C, and on the top of the top longitudinal pieces of the frame A A, are boxes I, Fig. 1, (only one of which is seen) in which the journals of the toothed cylinder revolve. On the toothed cylinder H, before described are arranged in lines parallel with the axis of said cylinder the teeth a, a, which are set at suitable distances from each other, so that they will pass between the knives in the cutter stock. The straw is received from the endless apron upon the teeth a, a, and by them forced against the stationary knives. In the toothed cylinder, is also cut, grooves b, b, corresponding in number to the number of knives, into which grooves the knives extend, so that no straw can pass through uncut.

On the front upright posts of the frame, and which extend above the side pieces for that purpose, is arranged the cutter stock J, which partially overhangs the toothed cylinder, said cutter stock acting as a guard, to prevent the straw from being fed in irregularly or crooked. The cutter stock is formed of a piece of timber of suitable size, into which saw cuts are made for receiving the knives c, c, and one of which knives is shown in full in Fig. 4. The knives are made of thin plate steel, of an oblong form with one corner rounded out, in concave form so as to be adapted to the toothed cylinder which works or revolves close to them. When the knives are set into the cuts prepared for them, the plates d, e, f, Fig. 4, are secured in place as represented in said figure, which holds the knives firmly in place, their cutting edges projecting sufficiently forward to allow them to enter the grooves in the toothed cylinder and perform the cutting operation. The top of the cutter stock is grooved or rounded out, as seen by dotted lines in Fig. 4, for the purpose of catching hold of, and drawing out the knives, when necessary, for grinding them, or for replacing a broken knife, or for any other purpose. This arrangement of curved stationary knives is found to be much preferable to the cylinder of knives, for when a knife became broken, or had to be removed from the cylinder, all the others between said knife and the end of the cylinder had to be first removed to get at it, whereas, by this method of arranging them, any knife can be withdrawn without disturbing either of the others.

Underneath the toothed cylinder, are placed series of cleaners $g$, $g$, Fig. 2, which are made of an angular form, the points entering the grooves in the cylinder H, for the purpose of cleaning the grooves of any straw which may have been forced into, and remain in the grooves. These cleaners are set in a frame K, which is secured to the frame of the machine, at the top of the sloping partition (the rear of which is seen at L, Fig. 1.) upon which the straw falls after being cut, and by which it is separated from the uncut material.

When the endless apron becomes slack, the set screw $h$, in the bearing blocks B, B, are loosened, and the blocks set out, by means of the slots in said blocks, until the apron is sufficiently tight, when the screws may be tightened up.

The operation of the machine is as follows: The straw being placed upon the endless apron crosswise, the machine is set in motion by the crank, which feeds up the straw to the toothed cylinder, the teeth on said cylinders straightens up the straw and carry it against the knives, where it is cut, and then drops upon a sloping partition which separates the cut from the uncut material. The cutter stock fitting down close to the teeth of the cylinder, also serves to regulate the quantity of straw fed in to the knives.

Having thus fully described my improved straw cutter, what I claim therein as new, and desire to secure by Letters Patent, is,

In combination with the toothed grooved cylinder and curved stationary knives, the cleaners $g$, $g$, arranged and operating substantially as herein represented and fully shown.

JONATHAN SULLIVAN.

Witnesses:
T. PHILLIPS ALLEN,
EDWD. NORTHEY.